United States Patent [19]
Canfield

[11] Patent Number: 5,342,133
[45] Date of Patent: Aug. 30, 1994

[54] PAPER MOVING SYSTEM FOR A PRINTER/PLOTTER

[75] Inventor: Brian P. Canfield, San Diego, Calif.

[73] Assignee: Hewlett-Packard Company, Palo Alto, Calif.

[21] Appl. No.: 997,258

[22] Filed: Dec. 23, 1992

[51] Int. Cl.5 .............................................. B41J 13/08
[52] U.S. Cl. ................................. 400/635; 220/172; 220/174; 220/176; 400/634
[58] Field of Search ............. 400/635, 634, 616, 616.1; 226/74, 75, 170, 171, 172, 173, 174, 175, 176, 177

[56] References Cited

U.S. PATENT DOCUMENTS

| | | | |
|---|---|---|---|
| 4,109,779 | 8/1978 | Bauer et al. | 400/635 |
| 4,821,049 | 4/1989 | Eckl | 400/635 |
| 5,133,616 | 7/1992 | Oyaide et al. | 400/635 |
| 5,184,907 | 2/1993 | Hamada et al. | 400/635 |

FOREIGN PATENT DOCUMENTS

| | | | |
|---|---|---|---|
| 2950392 | 6/1981 | Fed. Rep. of Germany | 400/635 |
| 0045368 | 2/1991 | Japan | 400/635 |
| 4166363 | 6/1992 | Japan | 400/635 |

*Primary Examiner*—Edgar S. Burr
*Assistant Examiner*—John S. Hilten

[57] ABSTRACT

A paper moving system for a computer driven printer/plotter comprises a paper pinching assembly positioned at the two oppositely facing edges of the paper adjacent the print zone 10. The edges of the paper are fed through each assembly where the paper is gripped between a lubricous shim plate 52 and a straight stretch of a paper drive belt 42 which frictionally engages the paper. The belts of each assembly are biased toward the shim plates by a spring urged rail 50 to hold the belts in non-slip engagement with the paper. The paper is tensioned edge to edge by the assemblies so that a paper table or platen underneath the print zone is unnecessary.

18 Claims, 4 Drawing Sheets ized by U.S. Pat. No. 4,834,298 dated May 17, 1983 to LaBarre, et al and assigned to the assignee of the present invention. In the LaBarre arrangement, paper or other printing media supported on a plotting table is moved by opposed drive and idler rollers positioned at either lateral side of the paper to pinch the paper edges therebetween. The paper moving rollers are preferably provided with a roughened surface which engages the paper by making slight indentations therein to minimize slippage. In one embodiment, yaw and side to side movement of the paper is minimized by ramps which bend the paper edges upward from the plane of printing and mounting of the idler rollers on pivotable axles such that the idler rollers urge the paper edge toward a paper edge stop.

PAPER MOVING SYSTEM FOR A PRINTER/PLOTTER

BACKGROUND OF THE INVENTION AND PRIOR ART

The prior art of paper moving systems for plotters is best exemplified by U.S. Pat. No. 4,834,298 dated May 17, 1983 to LaBarre, et al and assigned to the assignee of the present invention. In the LaBarre arrangement, paper or other printing media supported on a plotting table is moved by opposed drive and idler rollers positioned at either lateral side of the paper to pinch the paper edges therebetween. The paper moving rollers are preferably provided with a roughened surface which engages the paper by making slight indentations therein to minimize slippage. In one embodiment, yaw and side to side movement of the paper is minimized by ramps which bend the paper edges upward from the plane of printing and mounting of the idler rollers on pivotable axles such that the idler rollers urge the paper edge toward a paper edge stop.

Other prior art paper drives employ spring urged toothed drive rollers which mesh with perforations in the edges of the paper or other print media to pull the media through the print zone.

While such systems are acceptable, a paper moving system is desired which will provide edge to edge tension in unsupported and unperforated paper across the print zone without bending the paper edges or permitting yaw or side to side paper movement. In such an arrangement, a paper table or platen roller to support the paper or other print media in the printing zone is optional and the arrangement is therefore capable of opening up the print zone to make room to accommodate other apparatus such as means for pre or post-print heating of the print media. Generally speaking, the smaller the printer, the less necessary is a platen roller or paper table whereas in printers capable of handling larger media, a platen roller or paper table can be used if desired with the paper moving system disclosed herein.

SUMMARY OF THE INVENTION

The present invention provides a paper moving assembly for moving paper or other print media through the print zone of a computer driven printer/plotter, said print zone being defined in an X direction by the direction of movement of paper or other print medium and in the Y direction by the direction of movement of the printer carriage, said assembly comprising:

a) a mounting block and means for supporting said mounting block on said printer/plotter proximate said print zone;

b) a first belt roller and means for supporting said first belt roller on said printer/plotter proximate said print zone;

c) a media feed belt roller and means for supporting said media feed belt roller proximate said printing zone;

d) a media drive belt trained around said first roller and said feed roller and having a stretch moveable parallel to the path of movement of the paper or other print media;

e) a shim plate supported on said mounting block, said shim plate extending parallel to said stretch of belt and defining a paper gripping path therebetween for gripping an edge of the paper adjacent the print zone for moving the paper therethrough; and f) means for rotating at least one of said rollers to drive said belt.

The present invention further provides, in a computer driven printer/plotter having a chassis, means on said chassis for moving paper or other print media through the printer/plotter and a print head carriage moveable transversely of the direction of travel of the print media, a paper moving system comprising: a paper moving assembly on each lateral side of the print zone, each assembly being positioned to grip one of the edges of the paper, each assembly comprising:

a) a powered drive roller;

c) a media feed roller;

d) a media drive belt trained around said drive roller and said feed roller and having a stretch moveable parallel to the path of movement of the paper or other print media;

e) a shim plate, said shim plate extending parallel to said stretch of belt and defining a paper gripping path therebetween for gripping an edge of the paper adjacent the print zone; and f) means for rotating said drive roller, said assemblies being supported on said chassis.

DESCRIPTION OF THE PREFERRED EMBODIMENT

Figure 1:
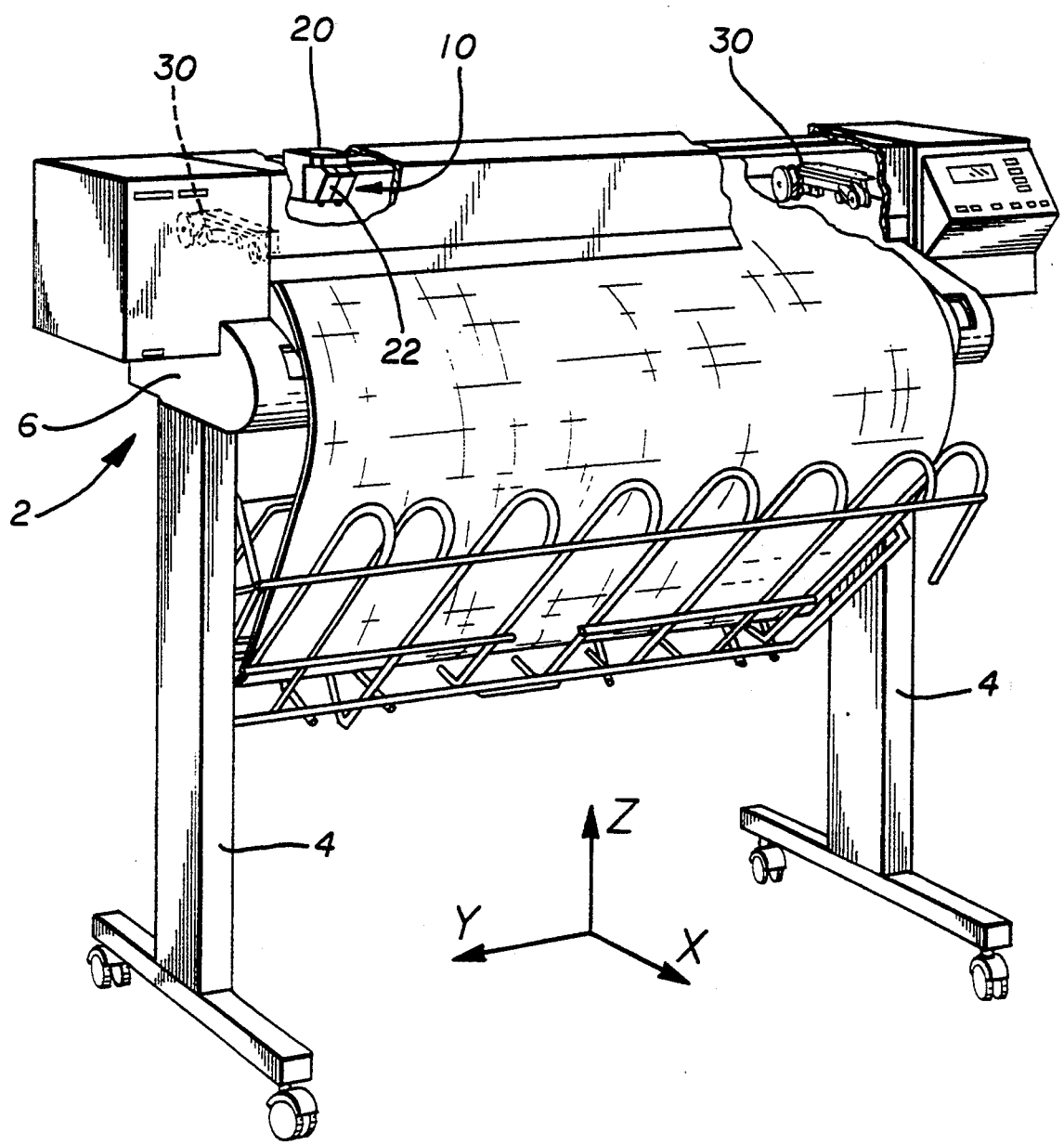
FIG. 1 is a perspective view of a computer driven printer showing the carriage supported on slider rods with a paper moving assembly of the present invention positioned at either side of the path of paper travel.

FIG. 1 is a perspective view of a printer/plotter mechanism having a chassis 2 supported by a pair of spaced legs 4 and a housing which includes a generally arcuate cover 6 for containing a roll 7 (FIG. 2) of print medium such as paper, vellum or film. The path of paper movement is shown by the dashed line in FIG. 2. As seen in the broken away section at the top of FIG. 1, the print zone, generally designated 10, extends transversely the entire width of the apparatus in the Y direction and has a reach extending in the X direction a relatively short distance of from one to about three inches although this length is technically unlimited. A pair of slider rods 12 (FIG. 2) support a transversely movable print head carriage 20 having one or more print heads 22 such as thermal inkjet print heads mounted thereon which are positioned a precise distance above the media in the print zone 10.

Figure 2:
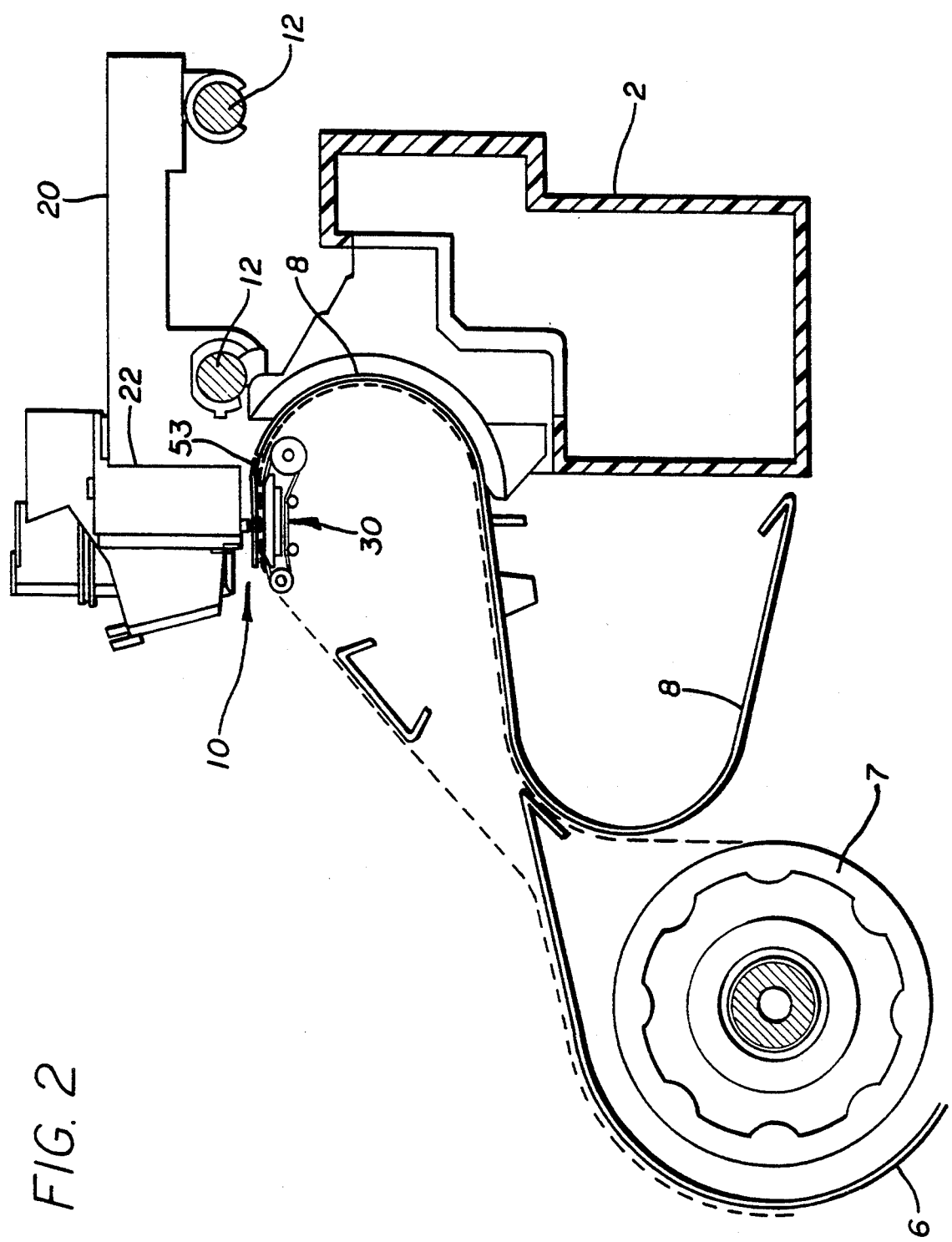
FIG. 2 is a partial cross sectional elevation of the printer taken from the right side thereof.

FIG. 2 shows a side elevation of the printer including the chassis 2 and the arrangement of the paper roll 7, roll cover 6, a curved paper guide 8, the carriage slider rods 12 and the print head carriage 20 mounted thereon. The paper moving system comprises a pair of paper moving assemblies 30, at least one of which is preferably affixed to the chassis 2 at one end of the path of travel of the carriage 20 and the other of which is affixed by means not shown for lateral adjustment across the print zone 10 (in the Y direction) to accommodate paper of differing widths.

Figure 3:
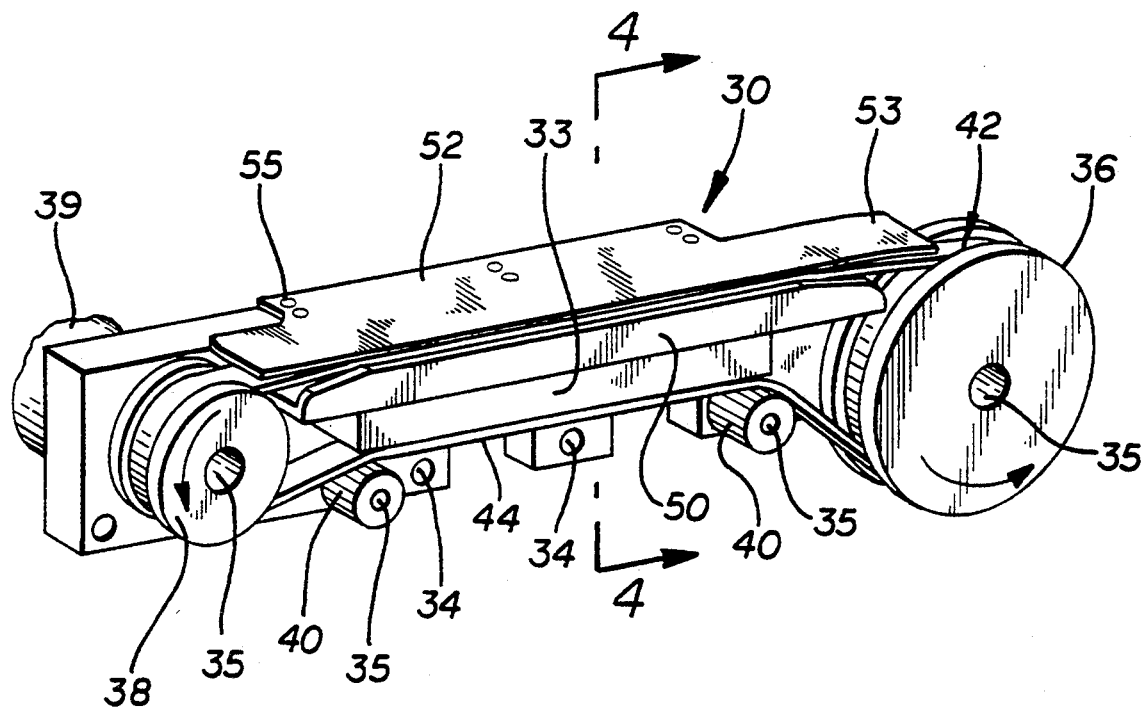
FIG. 3 is a schematic perspective of one of the paper moving assemblies of the present invention.
Figure 4:
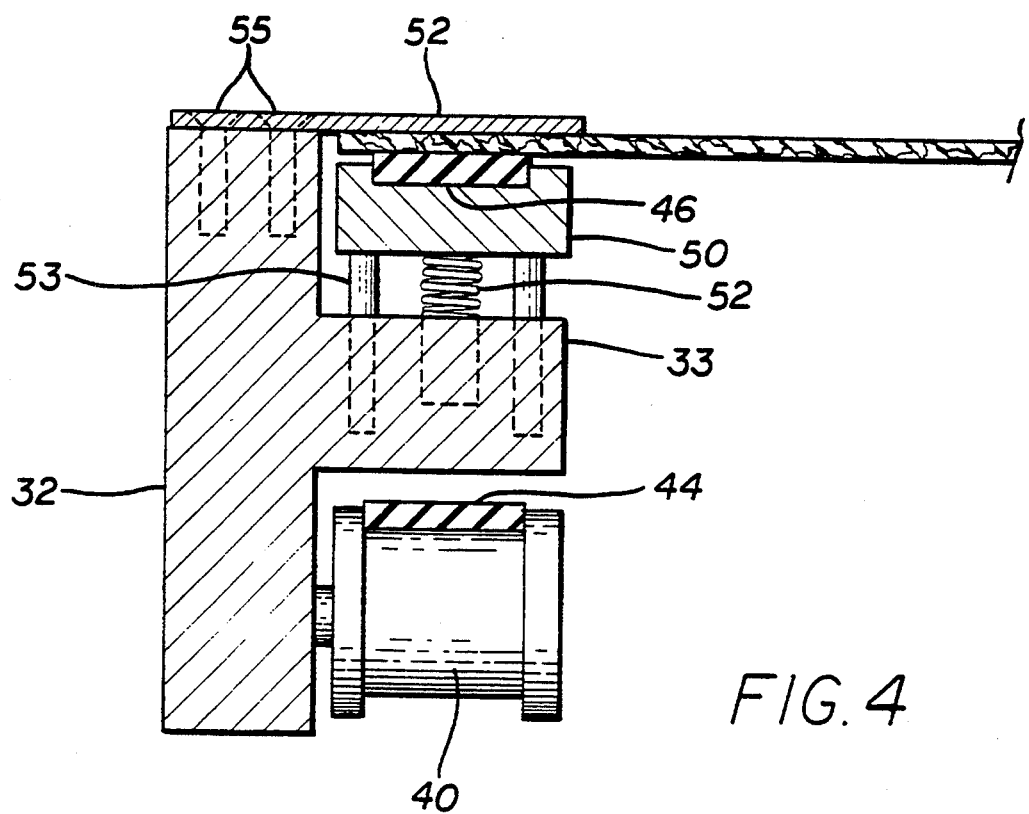
FIG. 4 is a cross sectional elevation taken at line 4—4 on FIG. 3.
Figure 5:
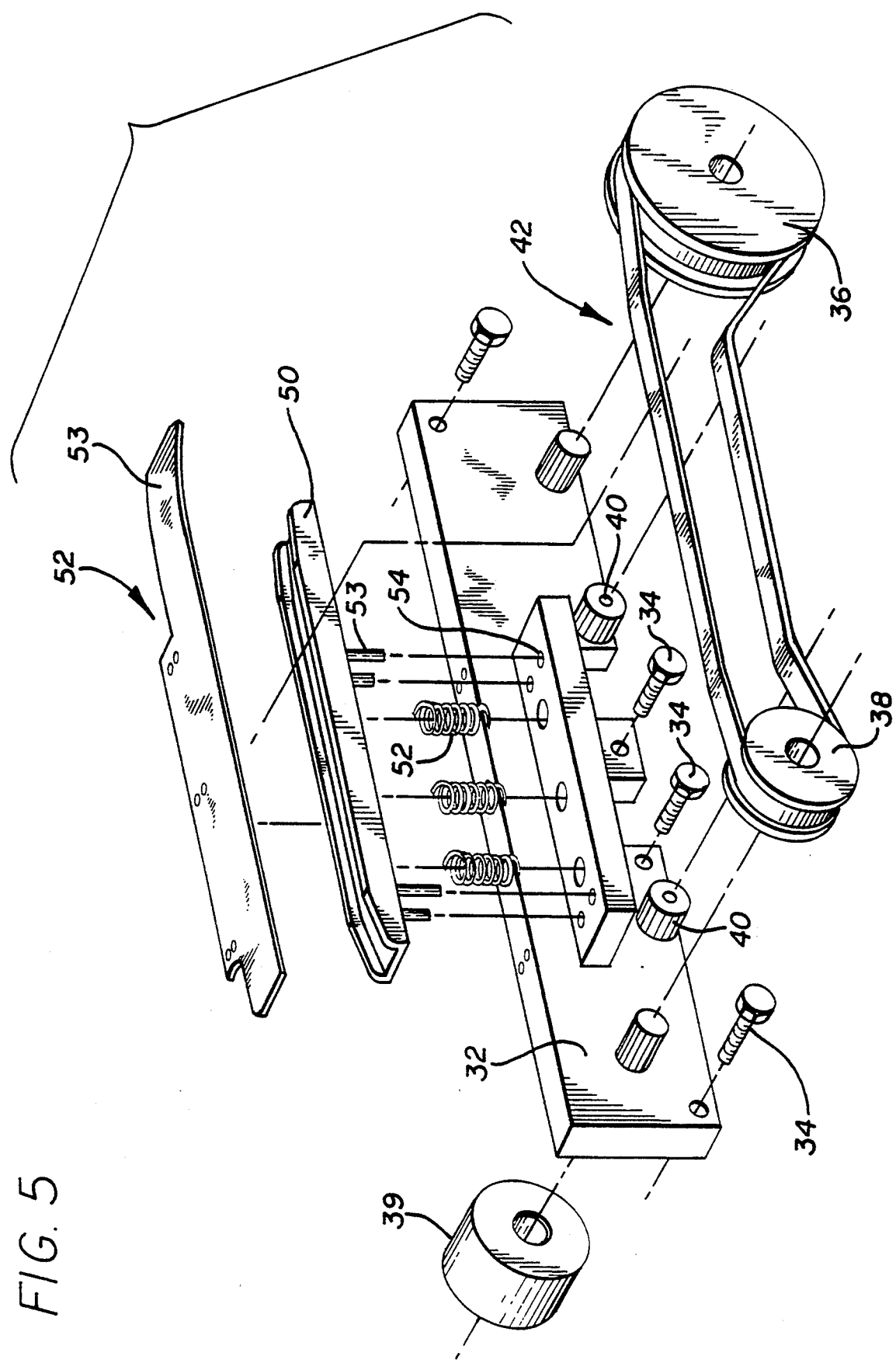
FIG. 5 is an exploded view of the paper moving system.

FIGS. 3, 4 and 5 illustrate a single one of the paper moving assemblies 30 which is comprised of a mounting block 32 which is attached by threaded fasteners 34 to the printer/plotter chassis 2. One such assembly 30 is positioned at each of the two opposite lateral sides of the printing zone 10 which is defined in the Y direction by the path of movement of the carriage 20 on the slider rods 12 and in the X direction by the reach of media pinched between the shim plates and paper moving belts to be described. The mounting block 32 supports a plurality of axles 35 on which are journalled a feed roller 36, a drive roller 38 and a pair of idler rollers 40. A motor 39 is supported on the mounting block to rotate the drive roller 38. Each of the rollers is preferably provided with a toothed peripheral surface which mates with the toothed inner surface of a paper drive belt 42 trained around the rollers as shown.

The lower reach 44 of the drive belt 42 passes over the two idler rollers 40 which are mounted on axles positioned at opposite ends of and beneath a horizontally extending shelf 33 on the mounting block 32. A belt support and biasing rail 50 in the form of an inverted channel is mounted on a plurality of compression springs 52 which are in turn supported by shelf 33. Guide posts 53 received in guide apertures 54 in shelf 33 constrain movement of the rail 50 to straight line movement in the direction desired. The upper reach 46 of the drive belt 42 passes over the belt support rail 50 which urges the drive belt upwardly toward a thin generally rectangular shim plate 52 which is fastened to the mounting block 32 by a plurality of fasteners 55 and which extends through the full reach (in the X direction) of the printing zone 10 above the upper reach 46 of the media drive belt 42. If desired, one or more stiffeners, not shown, may be affixed to the upper surface of the shim plate 52 to constrain vertical movement thereof. Since the inner toothed surface of belt 42 slideably passes over the rail 50, the belt teeth each have a smooth inner surface to minimize friction with the rail 50. The outer surface of the belt 42 is relatively rough compared with the smooth surfaces of the belt teeth so as to frictionally grip the paper edges.

One or more of the rollers 36, 38 40 may comprise a belt tightening roller adjustably positioned on the mounting block 32 for adjusting the tension in the belt 42 as desired. Although the drive belt 42 is shown and described as a toothed belt, a smooth friction driven belt could instead be used although frequent adjustment of belt tension to accommodate for wear and slippage is likely to be required.

The paper or other printing medium is fed into the paper moving assemblies 30 by the feed rollers 36 such that the edge portions (approximately 5 mm) of the paper are each gripped in a paper gripping path between the spring biased upper reach 46 of the paper drive belt 42 and the shim plate 52 and is moved by the belts in a straight path through the print zone 10. The shim plates 52 each preferably have a curved transition feed end 53 comprising a paper guide which converges toward the belt 42 and feed roller 36 to guide the end of the paper between the belt 42 and the shim plate 52 during feeding. As best seen in FIG. 2, the feed end 53 is positioned close to and in general alignment with the end of the curved paper guide 8.

Since the paper moving system of the present invention may be used in a printer/plotter without a paper supporting table or platen roller under the print zone 10, the paper is tensioned edge to edge by oppositely facing paper moving assemblies 30 and the belt support rails 50 may be configured to bias the upper reaches 46 of the paper moving belt 42 outwardly to tension the print media laterally of the direction of media travel.

Without limitation, the shim plate 52 and belt support rail 50 may both be constructed of lubricous material such as teflon filled polycarbonate and used with a polyurethane toothed belt 42 designed to grip approximately 5 mm of each paper edge.

The spring biased belts 42 easily accommodate different thicknesses of paper or other print media and can be made as long or short as desired to expand the size of the print zone in the X direction. Since a paper table or platen under the print zone 10 is optional, there need be no grit tubes or star wheels or paper pinch rollers to assist in moving the paper through the print zone 10. This leaves room for placement of drying equipment or vacuum equipment to hold the paper flat under the print zone if desired. A paper moving system constructed as described in the Example below has been found to be quieter than conventional grit wheel paper drive systems and the extended size of the paper edges which are gripped by the system as compared with the relative point contact of pinch wheel paper moving systems ensures consistent paper constraints across the print zone.

EXAMPLE

A prototype paper moving system was constructed according to the above teachings using a $\frac{1}{4}''$ belt arranged to pinch about a 5 mm edge at either side of the paper. The print zone reach of the belts extended about $2\frac{1}{2}''$. Toothed belts made of polyurethane were used in combination with shim plates and belt biasing rails made of Teflon filled polycarbonate so that the friction between the rails and the belts and the friction between the paper and the shim plates was minimized. The extended length of the portions of the belts which contact the paper provided the necessary amount of edge to edge tension and avoid slippage.

Optionally, the shims 53 may be bent and/or the rail 50 may be angled (possibly by inclining the guide posts 53 and apertures 54) to increase the amount of tension applied to the paper or other print medium.

Persons skilled in the art will readily appreciate that various modifications can be made from the preferred embodiment thus the scope of protection is intended to be defined only by the limitations of the appended claims.

What is claimed is:

1. A paper moving assembly for moving paper or other print media through a print zone of a computer driven printer/plotter, said print zone being defined in an X direction by the direction of movement of paper or other print medium and in the Y direction by the direction of movement of a printer carriage, said assembly comprising:
    a) a mounting block and means for supporting said mounting block on said printer/plotter proximate said print zone;
    b) a first belt roller and means for supporting said first belt roller on said printer/plotter proximate said print zone;
    c) a media feed belt roller and means for supporting said media feed belt roller proximate said print zone;
    d) a media drive belt trained around said first roller and said feed roller and having a stretch moveable parallel to a path of movement of the paper or other print media;

e) a shim plate fixedly attached to said mounting block, said shim plate extending parallel to said stretch of belt and defining a paper gripping path between said shim plate and said belt for gripping an edge of the paper adjacent the print zone for moving the paper therethrough;

f) a belt biasing rail supported on said mounting block, said rail supporting said stretch of belt;

g) means for biasing said rail and supported stretch of belt toward said shim plate; and h) means for rotating at least one of said rollers to drive said belt.

2. The assembly of claim 1, wherein said first roller is a drive roller and further comprising powered means for rotating said drive roller.

3. The assembly of claim 2, wherein said first roller and said feed roller and supported on said mounting block.

4. The assembly of claim 2, wherein said belt biasing rail is positioned between said rive roller and said feed roller.

5. The assembly of claim 4, wherein said rail is biased toward said shim plate by compression spring means supported on said mounting block.

6. The assembly of claim 4, further comprising means for adjusting the tension in said belt.

7. The assembly of claim 6, wherein said means for adjusting comprises a belt tightening roller in operative engagement with said belt.

8. The assembly of claim 4, wherein said belt has a toothed side having substantially flat relatively smooth tooth edges for minimizing friction with said rail and a relatively rough paper gripping side and said drive roller has a toothed periphery which mates with said toothed side of said belt.

9. The assembly of claim 4, wherein said shim plate includes a paper guide which converges toward said feed roller to guide said paper between said belt and said shim plate.

10. In a computer driven printer/plotter having a chassis, means on said chassis for moving paper or other print media through the printer/plotter and a print head carriage moveable transversely of the direction of travel of the print media, a paper moving system comprising: a paper moving assembly on each lateral side of a print zone, each assembly being positioned to grip an edge of said print media, each assembly comprising:

a) a powered drive roller;

c) a media feed roller;

d) a media drive belt trained around said drive roller and said feed roller and having a stretch moveable parallel to a path of movement of the paper or other print media;

e) a shim plate, said shim plate extending fixedly parallel to said stretch of belt and defining a paper gripping path between said shim plate and said belt for gripping and edge of said media adjacent the print zone;

f) a belt biasing rail supported on said mounting block, said rail supporting said stretch of belt;

g) means for biasing said rail and supported stretch of belt toward said shim plate; and h) means for rotating said drive roller, said assemblies being supported on said chassis.

11. The combination of claim 10, wherein said belt biasing rails are positioned between said drive roller and said feed roller of each said assembly, said rails biasing said stretches of said belts toward said shim plates.

12. The combination of claim 11, wherein said rails are biased toward said shim plates by resilient means.

13. The combination of claim 12, wherein each assembly further comprises a mounting block which supports the other elements of said assembly, said mounting block being affixed to the chassis of said printer/plotter.

14. The combination of claim 13, wherein said resilient means comprises compression spring means supported on said mounting blocks beneath the path of travel of the edges of the paper or other media.

15. The combination of claim 13, further comprising means for adjusting the tension in said belts.

16. The combination of claim 15, wherein said means for adjusting comprises a belt tightening roller in operative engagement with said belt.

17. The combination of claim 13, wherein said belts each have a toothed side having substantially flat relatively smooth tooth edges for minimizing friction with said rails and a relatively rough paper gripping side and said drive rollers have a toothed periphery which mates with said toothed sides of said belts.

18. The combination of claim 13, wherein said shim plates each include a paper guide which converges toward said feed rollers to guide said paper between said belts and said shim plates.

* * * * *